(12) United States Patent
Su

(10) Patent No.: US 9,408,112 B2
(45) Date of Patent: *Aug. 2, 2016

(54) SYNCHRONIZATION BEACON DETECTION

(71) Applicant: Apple Inc., Cupertino, CA (US)

(72) Inventor: Li Su, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/949,960

(22) Filed: Nov. 24, 2015

(65) Prior Publication Data

US 2016/0080980 A1 Mar. 17, 2016

Related U.S. Application Data

(63) Continuation of application No. 14/242,249, filed on Apr. 1, 2014, now Pat. No. 9,204,341.

(60) Provisional application No. 61/948,305, filed on Mar. 5, 2014.

(51) Int. Cl.
| | |
|---|---|
| *H04W 36/30* | (2009.01) |
| *H04W 36/00* | (2009.01) |
| *H04W 36/36* | (2009.01) |
| *H04W 52/02* | (2009.01) |
| *H04W 56/00* | (2009.01) |
| *H04W 88/06* | (2009.01) |
| *H04W 48/16* | (2009.01) |
| *H04W 36/14* | (2009.01) |

(52) U.S. Cl.
CPC ...... *H04W 36/0016* (2013.01); *H04W 36/0088* (2013.01); *H04W 36/30* (2013.01); *H04W 36/36* (2013.01); *H04W 52/0225* (2013.01); *H04W 56/001* (2013.01); *H04W 56/0085* (2013.01); *H04W 36/14* (2013.01); *H04W 48/16* (2013.01); *H04W 88/06* (2013.01)

(58) Field of Classification Search
CPC ..... H04W 36/32; H04W 36/30; H04W 36/18; H04W 36/08; H04W 36/0083
See application file for complete search history.

(56) References Cited

U.S. PATENT DOCUMENTS

| | | | |
|---|---|---|---|
| 8,229,433 B2 | 7/2012 | Parekh et al. | |
| 8,315,340 B1 * | 11/2012 | Kim | ...................... H04L 5/0005 375/316 |
| 8,427,975 B2 | 4/2013 | Das et al. | |
| 2006/0268800 A1 * | 11/2006 | Sugaya | ................... H04L 63/08 370/338 |
| 2007/0097922 A1 | 5/2007 | Parekh et al. | |

(Continued)

*Primary Examiner* — Sharad Rampuria
*Assistant Examiner* — Obidon Bassinan
(74) *Attorney, Agent, or Firm* — Meyertons Hood Kivlin Kowert & Goetzel, P.C.; Jeffrey C. Hood; Joel L. Stevens

(57) ABSTRACT

Performing detection of a synchronization beacon. The UE may include a first radio which supports, e.g., simultaneously, a first radio access technology (RAT) and a second RAT. The UE may perform transmission according to the first RAT on the first radio with a base station. The UE may receive a request to perform a tune-away to detect a synchronization beacon on the second RAT. The synchronization beacon may repetitively occur in successive first time periods. The UE may repeatedly perform a search for the synchronization beacon in different sub-portions over successive first time periods. The search may be repeatedly performed until the synchronization beacon is located in a respective sub-portion of one of the successive time periods.

20 Claims, 9 Drawing Sheets

(56) References Cited

U.S. PATENT DOCUMENTS

| | | | |
|---|---|---|---|
| 2007/0099619 A1* | 5/2007 | Parekh | H04W 36/18 455/439 |
| 2011/0199950 A1 | 8/2011 | Klingenbrunn et al. | |
| 2013/0148627 A1 | 6/2013 | Das et al. | |
| 2013/0215869 A1 | 8/2013 | Srinivasan et al. | |
| 2013/0230035 A1* | 9/2013 | Grandhi | H04W 48/16 370/338 |
| 2014/0031031 A1* | 1/2014 | Gauvreau | H04L 5/0053 455/426.1 |
| 2014/0133478 A1* | 5/2014 | Malladi | H04B 1/713 370/350 |
| 2014/0204850 A1 | 7/2014 | Kim et al. | |
| 2014/0308986 A1* | 10/2014 | Yang | H04W 88/06 455/552.1 |
| 2015/0289141 A1* | 10/2015 | Ghasemzadeh | H04W 72/044 370/330 |

* cited by examiner

SYNCHRONIZATION BEACON DETECTION

PRIORITY INFORMATION

The present application is a continuation application of U.S. patent application Ser. No. 14/242,249, filed Apr. 1, 2014, which will issue as U.S. Pat. No. 9,204,341 on Dec. 1, 2015, which claims benefit of priority of U.S. Provisional Application Ser. No. 61/948,305, titled "Improved Synchronization Beacon Detection", whose inventor is Li Su, which was filed on Mar. 5, 2014, and which is hereby incorporated by reference in its entirety as though fully and completely set forth herein.

FIELD OF THE INVENTION

The present application relates to wireless devices, and more particularly to a system and method for providing improved performance and/or reduced power consumption in wireless devices that support multiple radio access technologies (RATs).

DESCRIPTION OF THE RELATED ART

Wireless communication systems are rapidly growing in usage. Further, wireless communication technology has evolved from voice-only communications to also include the transmission of data, such as Internet and multimedia content. Therefore, improvements are desired in wireless communication. In particular, the large amount of functionality present in a user equipment (UE), e.g., a wireless device such as a cellular phone, can place a significant strain on the battery life of the UE. Further, where a UE is configured to support multiple radio access technologies (RATs), certain performance degradations can occur on one or more of the RATs, such as due to tune-away operations of the other RAT. As a result, techniques are desired which provide power savings and/or improved performance in such wireless UE devices.

New and improved cellular radio access technologies (RATs) are sometimes deployed in addition to existing RATs. For example, networks implementing Long Term Evolution (LTE) technology, developed and standardized by the Third Generation Partnership Project (3GPP), are currently being deployed. LTE and other newer RATs often support faster data rates than networks utilizing legacy RATs, such as various second generation (2G) and third generation (3G) RATs.

However, in some deployments, LTE and other new RATs may not fully support some services that can be handled by legacy networks. Accordingly, LTE networks are often co-deployed in overlapping regions with legacy networks and UE devices may transition between RATs as services or coverage may require. For example, in some deployments, LTE networks are not capable of supporting voice calls. Thus, for example when a UE device receives or initiates a circuit switched voice call while connected to an LTE network that does not support voice calls, the UE device can transition to a legacy network, such as one which uses a GSM (Global System for Mobile Communications) RAT or a "1×" (Code Division Multiple Access 2000 (CDMA2000) 1×) RAT that supports voice calls, among other possibilities.

Some UE devices use a single radio to support operation on multiple cellular RATs. For example, some UE devices use a single radio to support operation on both LTE and GSM networks. The use of a single radio for multiple RATs makes transitioning between networks, such as in response to a page message for an incoming voice call or circuit switched service, more complex. In addition, the use of a single radio for multiple RATs presents certain power usage and performance issues.

For example, in such systems the UE may periodically tune from the first network, using a more advanced RAT, to the second network, using a legacy RAT, e.g., to listen to a paging channel for a voice call. However, such tune-away operations from a more advanced RAT, such as LTE, to a legacy RAT, such as GSM, can result in increased power consumption and/or performance degradation of the LTE network.

Therefore, it would be desirable to provide improved performance and power consumption in wireless communication systems where a UE devices use a single radio to support operation on multiple cellular RATs.

SUMMARY OF THE INVENTION

Embodiments described herein relate to a User Equipment (UE) device and associated method for performing detection of a synchronization beacon. The UE may include a first radio which supports, e.g., simultaneously, a first radio access technology (RAT) and a second RAT. The UE may perform transmission according to the first RAT on the first radio with a base station. The UE may receive a request to perform a tune-away to detect a synchronization beacon on the second RAT. The synchronization beacon may repetitively occur in successive first time periods. The UE may repeatedly perform a search for the synchronization beacon in different sub-portions over successive first time periods. The search may be repeatedly performed until the synchronization beacon is located in a respective sub-portion of one of the successive time periods.

Embodiments described herein relate to a User Equipment (UE) device and associated method for using a frequency error estimate of a first RAT for a second RAT. A first radio of the UE may be operated according to a first radio access technology (RAT) and a second RAT. The first radio may have a lesser frequency of sleep and wake-up cycles when operating according to the first RAT than when operating according to the second RAT. The first radio may use a first clock for each of the first RAT and the second RAT, and the first clock may operate based on an oscillator in the UE. When the radio is operating according to the first RAT, after a plurality of cycles of sleep and wake-up, the UE may perform a frequency error estimate (FEE) of the first clock signal and adjust the first clock based on the frequency error estimate. The radio operating according to the first RAT performing the FEE and adjusting the first clock may operate to reduce a frequency of the radio performing a FEE and adjusting the first clock when operating according to the second RAT.

This Summary is provided for purposes of summarizing some exemplary embodiments to provide a basic understanding of aspects of the subject matter described herein. Accordingly, the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present invention can be obtained when the following detailed description of the embodiments is considered in conjunction with the following drawings.

Figure 1:
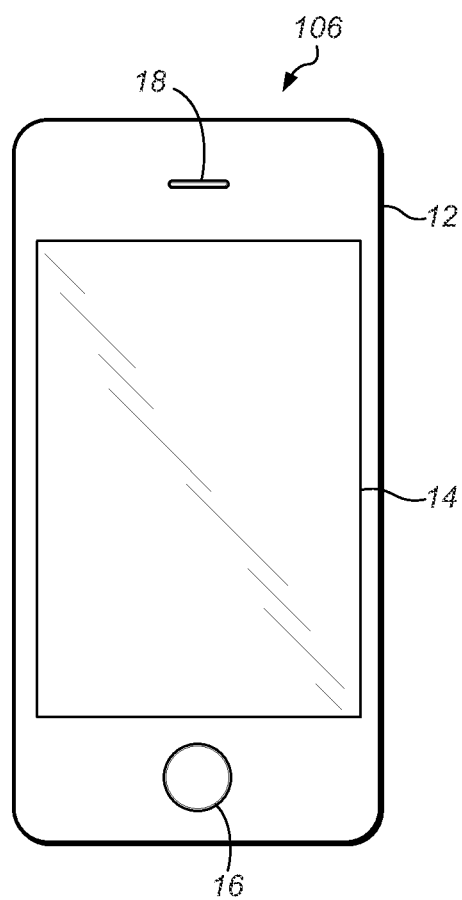
FIG. 1 illustrates an example user equipment (UE) according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms are used in the present disclosure.
3GPP: Third Generation Partnership Project
3GPP2: Third Generation Partnership Project 2
GSM: Global System for Mobile Communications
UMTS: Universal Mobile Telecommunications System
LTE: Long Term Evolution
RAT: Radio Access Technology
TX: Transmit
RX: Receive Terms The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a nonvolatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—User Equipment

FIG. 1 illustrates an example user equipment (UE) 106 according to one embodiment. The term UE 106 may be any of various devices as defined above. UE device 106 may include a housing 12 which may be constructed from any of various materials. UE 106 may have a display 14, which may be a touch screen that incorporates capacitive touch electrodes. Display 14 may be based on any of various display technologies. The housing 12 of the UE 106 may contain or comprise openings for any of various elements, such as home button 16, speaker port 18, and other elements (not shown), such as microphone, data port, and possibly various other types of buttons, e.g., volume buttons, ringer button, etc.

The UE 106 may support multiple radio access technologies (RATs). For example, UE 106 may be configured to communicate using any of various RATs such as two or more of Global System for Mobile Communications (GSM), Universal Mobile Telecommunications System (UMTS), Code Division Multiple Access (CDMA) (e.g., CDMA2000 1×RTT or other CDMA radio access technologies), Long Term Evolution (LTE), Advanced LTE, and/or other RATs. For example, the UE 106 may support at least two radio access technologies such as LTE and GSM. Various different or other RATs may be supported as desired.

The UE 106 may comprise one or more antennas. The UE 106 may also comprise any of various radio configurations, such as various combinations of one or more transmitter chains (TX chains) and one or more receiver chains (RX chains). For example, the UE 106 may comprise a radio that supports two or more RATs. The radio may comprise a single TX (transmit) chain and a single RX (receive) chain. Alternatively, the radio may comprise a single TX chain and two RX chains, e.g., that operate on the same frequency. In another embodiment, the UE 106 comprises two or more radios, i.e., two or more TX/RX chains (two or more TX chains and two or more RX chains).

In the embodiment described herein, the UE 106 comprises two antennas which communicate using two or more RATs. For example, the UE 106 may have a pair of cellular telephone antennas coupled to a single radio or shared radio. The antennas may be coupled to the shared radio (shared wireless communication circuitry) using switching circuits and other radio-frequency front-end circuitry. For example, the UE 106 may have a first antenna that is coupled to a transceiver or radio, i.e., a first antenna that is coupled to a transmitter chain (TX chain) for transmission and which is coupled to a first receiver chain (RX chain) for receiving. The UE 106 may also comprise a second antenna that is coupled to a second RX chain. The first and second receiver chains may share a common local oscillator, which means that both of the first and second receiver chains tune to the same frequency. The first and second receiver chains may be referred to as the primary receiver chain (PRX) and the diversity receiver chain (DRX).

In one embodiment, the PRX and DRX receiver chains operate as a pair and time multiplex among two or more RATs, such as LTE and one or more other RATs such as GSM or CDMA1×. In the primary embodiment described herein the UE 106 comprises one transmitter chain and two receiver chains (PRX and DRX), wherein the transmitter chain and the two receiver chains (acting as a pair) time multiplex between two (or more) RATs, such as LTE and GSM.

Each antenna may receive a wide range of frequencies such as from 600 MHz up to 3 GHz. Thus, for example, the local oscillator of the PRX and DRX receiver chains may tune to a specific frequency such as an LTE frequency band, where the PRX receiver chain receives samples from antenna 1 and the DRX receiver chain receives samples from antenna 2, both on the same frequency (since they use the same local oscillator). The wireless circuitry in the UE 106 can be configured in real time depending on the desired mode of operation for the UE 106. In the example embodiment described herein, the UE 106 is configured to support LTE and GSM radio access technologies.

Figure 2:
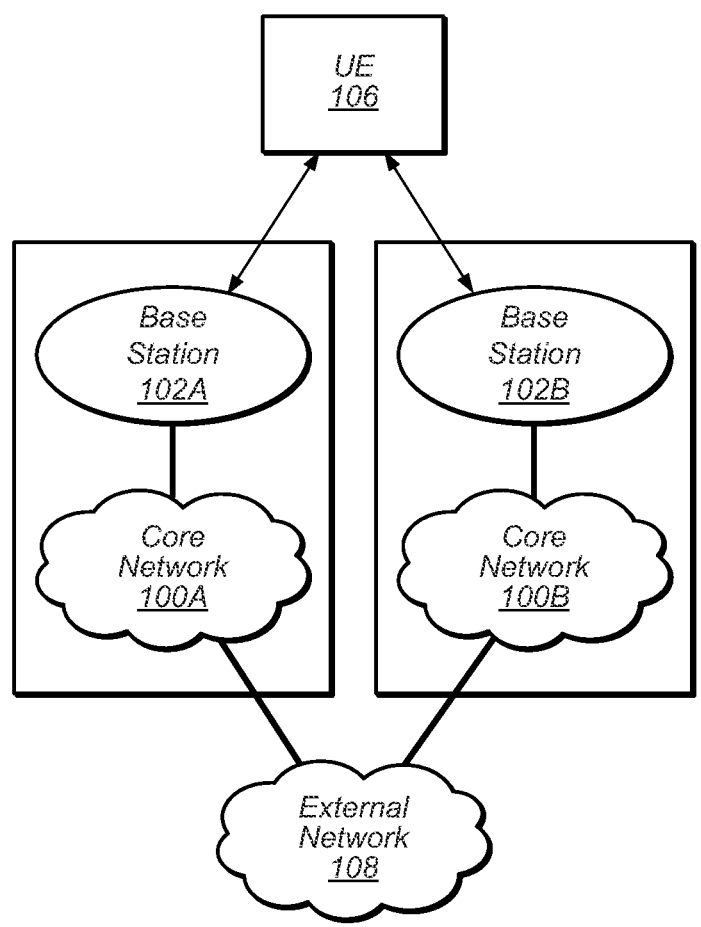
FIG. 2 illustrates an example wireless communication system where a UE communicates with two base stations using two different RATs.

FIG. 2—Communication System

FIG. 2 illustrates an exemplary (and simplified) wireless communication system. It is noted that the system of FIG. 2 is merely one example of a possible system, and embodiments may be implemented in any of various systems, as desired.

As shown, the exemplary wireless communication system includes base stations 102A and 102B which communicate over a transmission medium with one or more user equipment (UE) devices, represented as UE 106. The base stations 102 may be base transceiver stations (BTS) or cell sites, and may include hardware that enables wireless communication with the UE 106. Each base station 102 may also be equipped to communicate with a core network 100. For example, base station 102A may be coupled to core network 100A, while base station 102B may be coupled to core network 100B. Each core network may be operated by a respective cellular service provider, or the plurality of core networks 100A may be operated by the same cellular service provider. Each core network 100 may also be coupled to one or more external networks (such as external network 108), which may include the Internet, a Public Switched Telephone Network (PSTN), and/or any other network. Thus, the base stations 102 may facilitate communication between the UE devices 106 and/or between the UE devices 106 and the networks 100A, 100B, and 108.

The base stations 102 and the UEs 106 may be configured to communicate over the transmission medium using any of various radio access technologies ("RATs", also referred to as wireless communication technologies or telecommunication standards), such as GSM, UMTS (WCDMA), LTE, LTE Advanced (LTE-A), 3GPP2 CDMA2000 (e.g., 1×RTT, 1×EV-DO, HRPD, eHRPD), IEEE 802.11 (WLAN or Wi-Fi), IEEE 802.16 (WiMAX), etc.

Base station 102A and core network 100A may operate according to a first RAT (e.g., LTE) while base station 102B and core network 100B may operate according to a second (e.g., different) RAT (e.g., GSM, CDMA 2000 or other legacy or circuit switched technologies). The two networks may be controlled by the same network operator (e.g., cellular service provider or "carrier"), or by different network operators, as desired. In addition, the two networks may be operated independently of one another (e.g., if they operate according to different RATs), or may be operated in a somewhat coupled or tightly coupled manner.

Note also that while two different networks may be used to support two different RATs, such as illustrated in the exemplary network configuration shown in FIG. 2, other network configurations implementing multiple RATs are also possible. As one example, base stations 102A and 102B might operate according to different RATs but couple to the same core network. As another example, multi-mode base stations capable of simultaneously supporting different RATs (e.g., LTE and GSM, LTE and CDMA2000 1×RTT, and/or any other combination of RATs) might be coupled to a core network that also supports the different cellular communication technologies. In one embodiment, the UE 106 may be configured to use a first RAT that is a packet-switched technology (e.g., LTE) and a second RAT that is a circuit-switched technology (e.g., GSM or 1×RTT).

As discussed above, UE 106 may be capable of communicating using multiple RATs, such as those within 3GPP, 3GPP2, or any desired cellular standards. The UE 106 might also be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of network communication standards are also possible.

Base stations 102A and 102B and other base stations operating according to the same or different RATs or cellular communication standards may thus be provided as a network of cells, which may provide continuous or nearly continuous overlapping service to UE 106 and similar devices over a wide geographic area via one or more radio access technologies (RATs).

Figure 3:
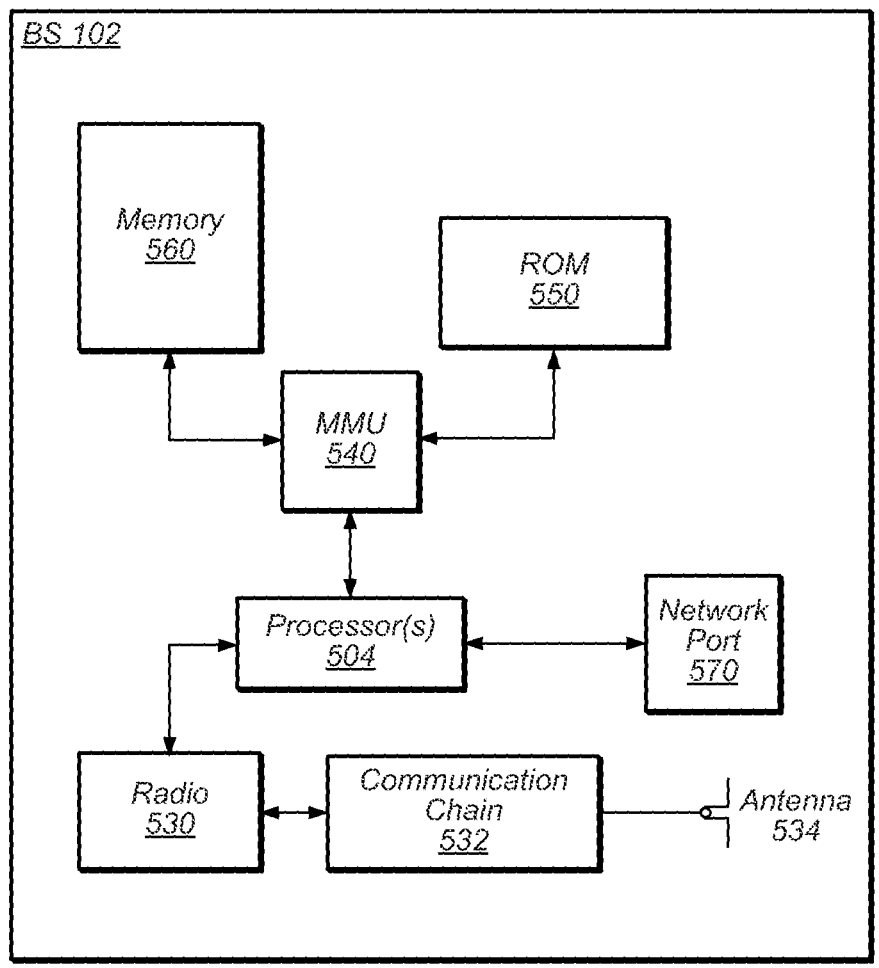
FIG. 3 is an example block diagram of a base station, according to one embodiment.

FIG. 3—Base Station

FIG. 3 illustrates an exemplary block diagram of a base station 102. It is noted that the base station of FIG. 3 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices 106 serviced by the cellular service provider).

The base station 102 may include at least one antenna 534. The at least one antenna 534 may be configured to operate as a wireless transceiver and may be further configured to communicate with UE devices 106 via radio 530. The antenna 534 communicates with the radio 530 via communication chain 532. Communication chain 532 may be a receive chain, a transmit chain or both. The radio 530 may be configured to communicate via various RATs, including, but not limited to, LTE, GSM, WCDMA, CDMA2000, etc.

The processor(s) 504 of the base station 102 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

Figure 4:
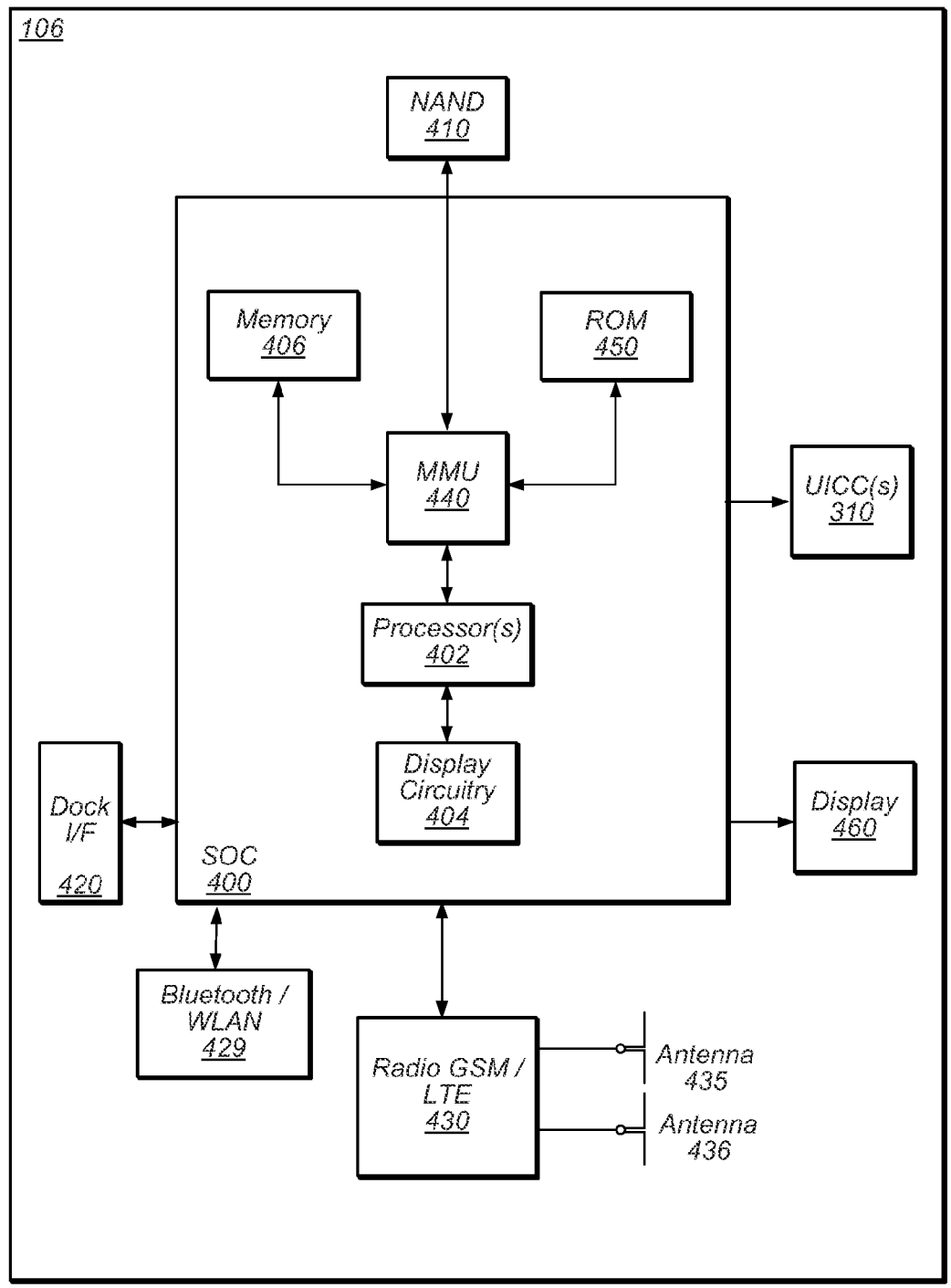
FIG. 4 is an example block diagram of a UE, according to one embodiment.

FIG. 4—User Equipment (UE)

FIG. 4 illustrates an example simplified block diagram of a UE 106. As shown, the UE 106 may include a system on chip (SOC) 400, which may include portions for various purposes. The SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, cellular communication circuitry 430 such as for LTE, GSM, etc., and short range wireless communication circuitry 429 (e.g., Bluetooth and WLAN circuitry). The UE 106 may further comprise one or more smart cards 310 that comprise SIM (Subscriber Identity Module) functionality, such as one or more UICC(s) (Universal Integrated Circuit Card(s)) cards 310. The cellular communication circuitry 430 may couple to one or more antennas, preferably two antennas 435 and 436 as shown. The short range wireless communication circuitry 429 may also couple to one or both of the antennas 435 and 436 (this connectivity is not shown for ease of illustration).

As shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, cellular communication circuitry 430, short range wireless communication circuitry 429, connector I/F 420, and/or display 460. The MMU 440 may be configured to perform memory protection and page table translation or set up. In some embodiments, the MMU 440 may be included as a portion of the processor(s) 402.

In one embodiment, as noted above, the UE 106 comprises at least one smart card 310, such as a UICC 310, which executes one or more Subscriber Identity Module (SIM) applications and/or otherwise implement SIM functionality. The at least one smart card 310 may be only a single smart card 310, or the UE 106 may comprise two or more smart cards 310. Each smart card 310 may be embedded, e.g., may be soldered onto a circuit board in the UE 106, or each smart card 310 may be implemented as a removable smart card. Thus the smart card(s) 310 may be one or more removable smart cards (such as UICC cards, which are sometimes referred to as "SIM cards"), and/or the smart card(s) 310 may be one or more embedded cards (such as embedded UICCs (eUICCs), which are sometimes referred to as "eSIMs" or "eSIM cards"). In some embodiments (such as when the smart card(s) 310 include an eUICC), one or more of the smart card(s) 310 may implement embedded SIM (eSIM) functionality; in such an embodiment, a single one of the smart card(s) 310 may execute multiple SIM applications. Each of the smart card(s) 310 may include components such as a processor and a memory; instructions for performing SIM/eSIM functionality may be stored in the memory and executed by the processor. In one embodiment, the UE 106 may comprise a combination of removable smart cards and fixed/non-removable smart cards (such as one or more eUICC cards that implement eSIM functionality), as desired. For example, the UE 106 may comprise two embedded smart cards 310, two removable smart cards 310, or a combination of one embedded smart card 310 and one removable smart card 310. Various other SIM configurations are also contemplated.

As noted above, in one embodiment, the UE 106 comprises two or more smart cards 310, each implementing SIM functionality. The inclusion of two or more SIM smart cards 310 in the UE 106 may allow the UE 106 to support two different telephone numbers and may allow the UE 106 to communicate on corresponding two or more respective networks. For example, a first smart card 310 may comprise SIM functionality to support a first RAT such as LTE, and a second smart card 310 may comprise SIM functionality to support a second RAT such as GSM. Other implementations and RATs are of course possible. Where the UE 106 comprises two smart cards 310, the UE 106 may support Dual SIM Dual Active (DSDA) functionality. The DSDA functionality may allow the UE 106 to be simultaneously connected to two networks (and use two different RATs) at the same time. The DSDA functionality may also allow the UE 106 may to simultaneously receive voice calls or data traffic on either phone number. In another embodiment, the UE 106 supports Dual SIM Dual Standby (DSDS) functionality. The DSDS functionality may allow either of the two smart cards 310 in the UE 106 to be on standby waiting for a voice call and/or data connection. In DSDS, when a call/data is established on one SIM 310, the other SIM 310 is no longer active. In one embodiment, DSDx functionality (either DSDA or DSDS functionality) may be implemented with a single smart card (e.g., a eUICC) that executes multiple SIM applications for different carriers and/or RATs.

As noted above, the UE 106 may be configured to communicate wirelessly using multiple radio access technologies (RATs). As further noted above, in such instances, the cellular communication circuitry (radio(s)) 430 may include radio components which are shared between multiple RATS and/or radio components which are configured exclusively for use according to a single RAT. Where the UE 106 comprises at least two antennas, the antennas 435 and 436 may be configurable for implementing MIMO (multiple input multiple output) communication.

As described herein, the UE 106 may include hardware and software components for implementing features for communicating using two or more RATs, such as those described herein. The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 5A:
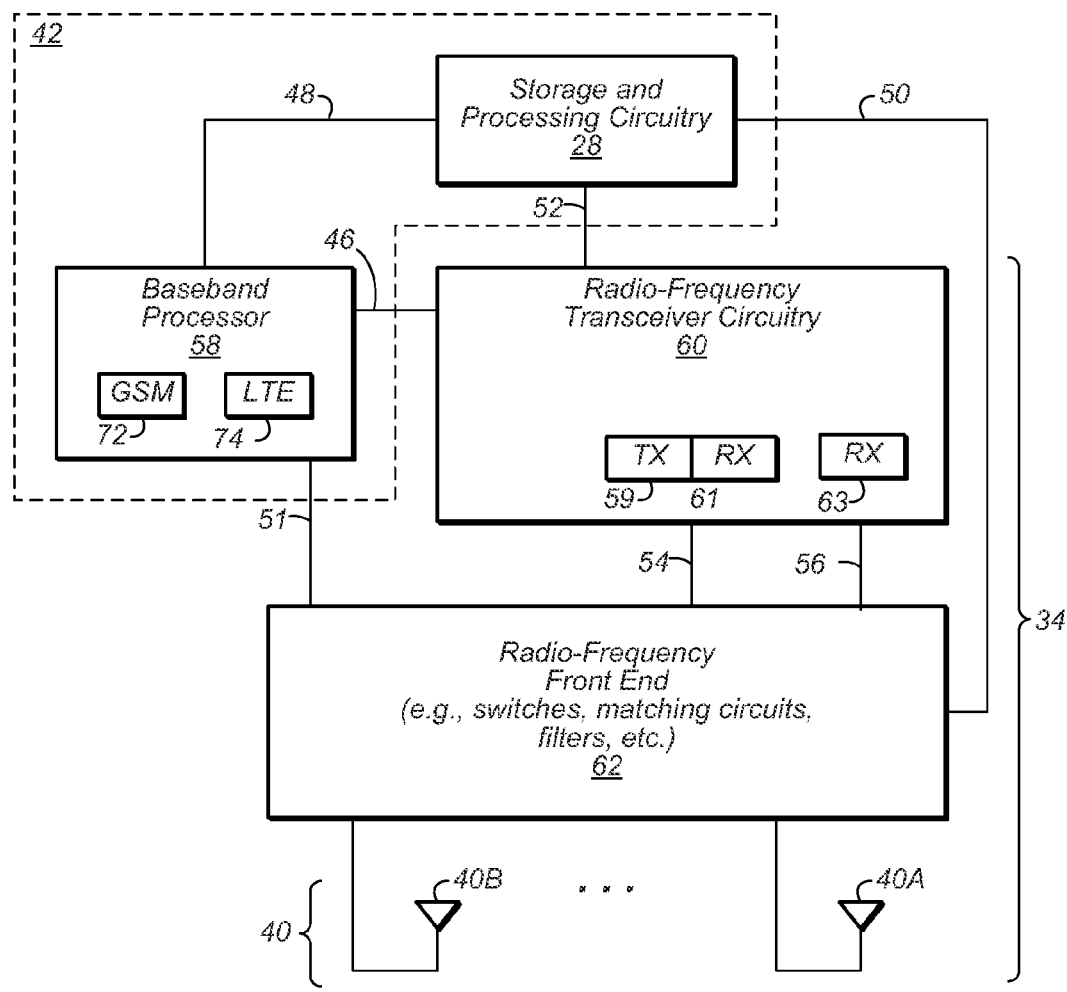
FIGS. 5A and 5B are example block diagrams of wireless communication circuitry in the UE, according to one embodiment.
Figure 5B:
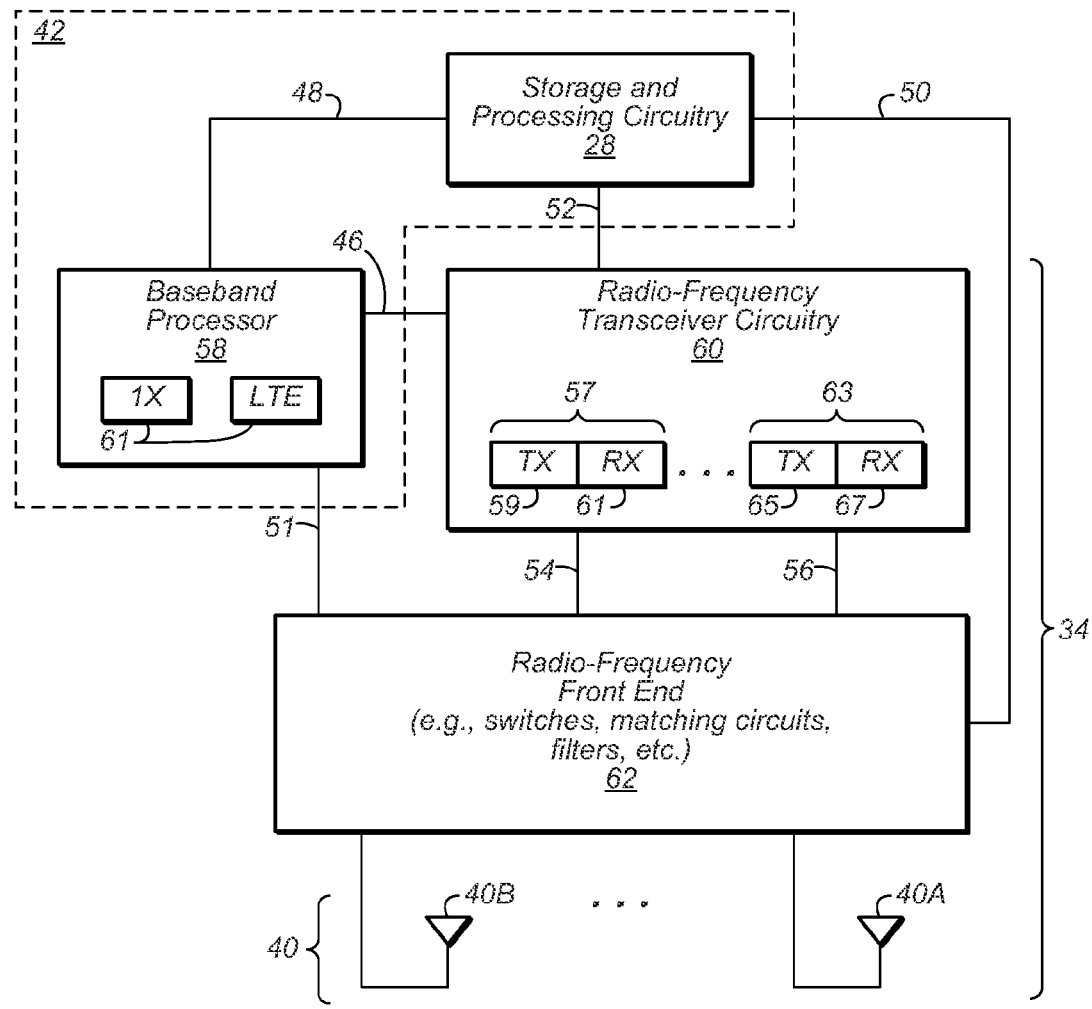

FIGS. 5A and 5B—UE Transmit/Receive Logic

FIG. 5A illustrates a portion of UE 106 according to one embodiment. As shown, UE 106 may comprise control circuitry 42 that is configured to store and execute control code for implementing control algorithms in the UE 106. Control circuitry 42 may include storage and processing circuitry 28 (e.g., a microprocessor, memory circuits, etc.) and may include baseband processor integrated circuit 58. Baseband processor 58 may form part of wireless circuitry 34 and may include memory and processing circuits (i.e., baseband processor 58 may be considered to form part of the storage and processing circuitry of UE 106). Baseband processor 58 may comprise software and/or logic for handling various different RATs, such as GSM logic 72 and LTE logic 74, among others.

Baseband processor 58 may provide data to storage and processing circuitry 28 (e.g., a microprocessor, nonvolatile memory, volatile memory, other control circuits, etc.) via path 48. The data on path 48 may include raw and processed data associated with UE cellular communications and operations, such as cellular communication data, wireless (antenna) performance metrics for received signals, information related to tune-away operations, information related to paging operations, etc. This information may be analyzed by storage and processing circuitry 28 and/or processor 58 and, in response, storage and processing circuitry 28 (or, if desired, baseband processor 58) may issue control commands for controlling wireless circuitry 34. For example, storage and processing circuitry 28 may issue control commands on path 52 and path 50 and/or baseband processor 58 may issue commands on path 46 and path 51.

Wireless circuitry 34 may include radio-frequency transceiver circuitry such as radio-frequency transceiver circuitry 60 and radio-frequency front-end circuitry 62. Radio-frequency transceiver circuitry 60 may include one or more radio-frequency transceivers. In the embodiment shown radio-frequency transceiver circuitry 60 comprises transceiver (TX) chain 59, receiver (RX) chain 61 and RX chain 63. As noted above, the two RX chains 61 and 63 may be a primary RX chain 61 and a diversity RX chain 63. The two RX chains 61 and 63 may be connected to the same local oscillator (LO) and thus may operate together at the same frequency for MIMO operations. Thus the TX chain 59 and the two RX chains 61 and 63 may be considered, along with other necessary circuitry, as a single radio. Other embodiments are of course contemplated. For example, the radio-frequency transceiver circuitry 60 may comprise only a single TX chain and only a single RX chain, also a single radio embodiment. Thus the term "radio" may be defined to have the broadest scope of its ordinary and accepted meaning, and comprises the circuitry normally found in a radio, including either a single TX chain and a single RX chain or a single TX chain and two (or more) RX chains, e.g., connected to the same LO. The term radio may encompass the transmit and receive chains discussed above and may also include digital signal processing coupled to the radio frequency circuitry (e.g., the transmit and receive chains) associated with performing wireless communication. As one example, the transmit chain may include such components as amplifier, mixer, filter, and digital analog converter. Similarly, the receive chain(s) may include, e.g., such components as amplifier, mixer, filter, and analog to digital converter. As mentioned above, multiple receive chains may share a LO, although in other embodiments, they may comprise their own LO. Wireless communication circuitry may encompass a larger set of components, e.g., including one or more radios of the UE (transmit/receive chains and/or digital signal processing), baseband processors, etc. The term "cellular wireless communication circuitry" includes various circuitry for performing cellular communication, e.g., as opposed to other protocols that are not cellular in nature, such as Bluetooth. Certain embodiments of the invention described herein may operate to improve performance when a single radio (i.e., a radio with a single TX chain and single RX chain; or a radio with a single TX chain and two RX chains, where the two RX chains are connected to the same LO) supports multiple RATs.

As shown in FIG. 5B, the radio-frequency transceiver circuitry 60 may also comprise two or more TX chains and two or more RX chains. For example, FIG. 5B shows an embodiment with a first radio 57 comprising TX chain 59 and RX chain 61 and a second radio 63 comprising a first TX chain 65 and a second TX chain 67. Embodiments are also contemplated where additional TX/RX receive chains may be included in the embodiment of FIG. 5A, i.e., in addition to the one TX chain 59 and two RX chains 61 and 63 shown. In these embodiments that have multiple TX and RX chains, when only one radio is currently active, e.g., the second radio is turned off to save power, certain embodiments of the invention described herein may operate to improve performance of the single active radio when it supports multiple RATs.

Baseband processor 58 may receive digital data that is to be transmitted from storage and processing circuitry 28 and may use path 46 and radio-frequency transceiver circuitry 60 to transmit corresponding radio-frequency signals. Radio-frequency front end 62 may be coupled between radio-frequency transceiver 60 and antennas 40 and may be used to convey the radio-frequency signals that are produced by radio-frequency transceiver circuitry 60 to antennas 40. Radio-frequency front end 62 may include radio-frequency switches, impedance matching circuits, filters, and other circuitry for forming an interface between antennas 40 and radio-frequency transceiver 60.

Incoming radio-frequency signals that are received by antennas 40 may be provided to baseband processor 58 via radio-frequency front end 62, paths such as paths 54 and 56, receiver circuitry in radio-frequency transceiver 60, and paths such as path 46. Path 54 may, for example, be used in handling signals associated with transceiver 57, whereas path 56 may be used in handling signals associated with transceiver 63. Baseband processor 58 may convert received signals into digital data that is provided to storage and processing circuitry 28. Baseband processor 58 may also extract information from received signals that is indicative of signal quality for the channel to which the transceiver is currently tuned. For example, baseband processor 58 and/or other circuitry in control circuitry 42 may analyze received signals to produce various measurements, such as bit error rate measurements, measurements on the amount of power associated with incoming wireless signals, strength indicator (RSSI) information, received signal code power (RSCP) information, reference symbol received power (RSRP) information, signal-to-interference ratio (SINR) information, signal-to-noise ratio (SNR) information, channel quality measurements based on signal quality data such as Ec/Io or Ec/No data, etc.

Radio-frequency front end 62 may include switching circuitry. The switching circuitry may be configured by control signals received from control circuitry 42 (e.g., control signals from storage and processing circuitry 28 via path 50 and/or control signals from baseband processor 58 via path 51). The switching circuitry may include a switch (switch circuit) that is used to connect TX and RX chain(s) to antennas 40A and 40B. Radio-frequency transceiver circuitry 60 may be configured by control signals received from storage and processing circuitry over path 52 and/or control signals received from baseband processor 58 over path 46.

The number of antennas that are used may depend on the operating mode for UE 106. For example, as shown in FIG. 5A, in normal LTE operations, antennas 40A and 40B may be used with respective receivers 61 and 63 to implement a receive diversity scheme, such as for MIMO operations. With this type of arrangement, two LTE data streams may be simultaneously received and processed using baseband processor 58. When it is desired to monitor a GSM paging channel for incoming GSM pages, one or both of the antennas may be temporarily used in receiving GSM paging channel signals.

Control circuitry 42 may be used to execute software for handling more than one radio access technology. For example, baseband processor 58 may include memory and control circuitry for implementing multiple protocol stacks such as a GSM protocol stack 72 and an LTE protocol stack 74. Thus, protocol stack 72 may be associated with a first radio access technology such as GSM (as an example), and protocol stack 74 may be associated with a second radio access technology such as LTE (as an example). During operation, UE 106 may use GSM protocol stack 72 to handle GSM functions and may use LTE protocol stack 74 to handle LTE functions. Additional protocol stacks, additional transceivers, additional antennas 40, and other additional hardware and/or software may be used in UE 106 if desired. The arrangement of FIGS. 5A and 5B is merely illustrative. In one embodiment, one or both of the protocol stacks may be configured to implement the methods described in the flowcharts below.

In one embodiment of FIG. 5A (or 5B), the cost and complexity of UE 106 may be minimized by implementing the wireless circuitry of FIG. 5A (or 5B) using an arrangement in which baseband processor 58 and radio-transceiver circuitry 60 are used to support both LTE and GSM traffic.

The GSM radio access technology may generally be used to carry voice traffic, whereas the LTE radio access technology may generally be used to carry data traffic. To ensure that GSM voice calls are not interrupted due to LTE data traffic, GSM operations may take priority over LTE operations. To ensure that operations such as monitoring a GSM paging channel for incoming paging signals do not unnecessarily disrupt LTE operations, control circuitry 42 can, whenever possible, configure the wireless circuitry of UE 106 so that wireless resources are shared between LTE and GSM functions.

When a user has an incoming GSM call, the GSM network may send UE 106 a paging signal (sometimes referred to as a page) on the GSM paging channel using base station 102. When UE 106 detects an incoming page, UE 106 can take suitable actions (e.g., call establishment procedures) to set up and receive the incoming GSM call. Pages are typically sent several times at fixed intervals by the network, so that devices such as UE 106 will have multiple opportunities to successfully receive a page.

Proper GSM page reception may require that the wireless circuitry of UE 106 be periodically tuned to the GSM paging channel, referred to as a tune-away operation. If the transceiver circuitry 60 fails to tune to the GSM paging channel or if the GSM protocol stack 72 in baseband processor 58 fails to monitor the paging channel for incoming pages, GSM pages will be missed. On the other hand, excessive monitoring of the GSM paging channel may have an adverse impact on an active LTE data session. Embodiments of the invention may comprise improved methods for handling tune-away operations, as described below.

In some embodiments, in order for the UE 106 to conserve power, the GSM and LTE protocol stacks 72 and 74 may support idle mode operations. Also, one or both of the protocol stacks 72 and 74 may support a discontinuous reception (DRX) mode and/or a connected discontinuous reception (CDRX) mode. DRX mode refers to a mode which powers down at least a portion of UE circuitry when there is no data (or voice) to be received. In DRX and CRDX modes, the UE 106 synchronizes with the base station 102 and wakes up at specified times or intervals to listen to the network. DRX is present in several wireless standards such as UMTS, LTE (Long-term evolution), WiMAX, etc. The terms "idle mode", "DRX" and "CDRX" are explicitly intended to at least include the full extent of their ordinary meaning, and are intended to encompass similar types of modes in future standards.

Synchronization Beacon Detection

As discussed above, a UE may use a single radio (e.g., having a single transmit chain and a single receive chain, although a single transmit chain a double receive chains are also envisioned) to communicate using two different RATs. For example, the UE may use a single radio to communicate using a first RAT and may periodically tune away in order to perform various actions for a second RAT, such as page decoding, measurement, synchronization, etc. In this example, the UE may be considered as maintaining a connection to both RATs using the same radio, even though it may only communicate using one RAT at a time. Note that the radio may be the single cellular radio for the UE or may be one of a plurality of cellular radios. In a multiple radio embodiment, and one of the cellular radios may be used for time-sharing of the first RAT and the second RAT. Additionally, the UE may implement dual SIM dual active (DSDA) and/or dual SIM dual standby (DSDS), as desired.

In one embodiment, the first RAT may be LTE and the second RAT may be GSM, although other combinations of RATs are envisioned. In some cases, it may be typical to tune away periodically in order to perform synchronization for the second RAT (e.g., for neighboring base stations of the current base station of the second RAT). In the following, the first RAT may be described as LTE and the second RAT may be described as GSM, but any of these descriptions may apply to other RATs, as desired.

In comparison to CDMA 2000 1x, SRLTE for GSM may have significant differences. For example, GSM tune-away (e.g., for page decoding) may be 10 times more frequent (e.g., at least once per 470 ms) than 1x tune-way which is once per 5.21 s. Additionally, in most cases, the duration of each GSM tune-away may be very short, e.g., 10-20 milliseconds, while in most cases duration of 1x tune-away may be 90-100 milliseconds.

However, there may be situations where synchronization procedures for GSM may take a significant amount of time, which may reduce LTE throughput because the LTE network may interpret the tune-away of the radio to GSM as a deep fading event and reduce coding and modulation schemes and/or resource block allocation. As one example, in an area where GSM coverage is weak, or many GSM cells clustered (e.g., in typical urban area), GSM tone detection for searching many new or lost GSM cells may take a long time to complete. For example, to detect a GSM cell, the UE may need to receive radio frequency signals of at least 10 GSM frames (total 46 ms) continuously, and search for the location of the FCCH slot or burst within those 10 frames. In addition, typically to avoid missing detection of the FCCH slot, multiple (e.g., 2 or 3) 10-GSM-frames are needed. However, as mentioned above, tuning away from LTE for this period of time may incur significant throughput issues for LTE when using a radio for both LTE and GSM. For example, the LTE network may dramatically throttle grant/MCS allocation if a large cluster of missing LTE frames occur in a row or over a short period of time.

Accordingly, some of these issues may be resolved by distributing the GSM tone detection from a long tune away to multiple shorter tune aways over a longer period of time. For example, by distributing the tone detection, the LTE network may observe multiple quick fading over a longer time rather than continuous deep fading, which may result in a lower average block error rate (BLER). This lower BLER may avoid triggering a dramatic grant or MCS drop for LTE.

In one embodiment, for lower GSM received signal strength indicators (RSSIs) (e.g., less than or equal to −90 dBm), the first 10-GSM-frame period may be sampled continuously, FCCH tone detection may be performed on the samples, and then reconfirmed for the 2nd and 3rd 10-GSM-frame periods. However, to confirm, the UE may read different 10 ms long samples from each 10-GSM-frame period within a set of five 10-GSM-fame periods. Then, these four pieces of 10 millisecond samples may be combined to form one 50 millisecond sample, which can be used for tone detection, e.g., as a single 10-GSM period.

For higher GSM RSSI, even the 1st 10-GSM frame period samples can be read across multiple 10-GSM-frame periods, if desired.

Additionally, tone detection can be pipelined. For example, following the 10 ms samples from above, tone detection may be performed on each available received 10 ms samples, while the next 10 millisecond samples is being received or sampled. Accordingly, when all samples are collected, the final tone detection can be used as a quick confirmation of the tone detection already performed on the 10 millisecond samples.

Following these embodiments, there may be a dramatic improvement in LTE throughput for this situation, e.g., degradation may be reduced from 40-50% to below 20%.

Figure 6:
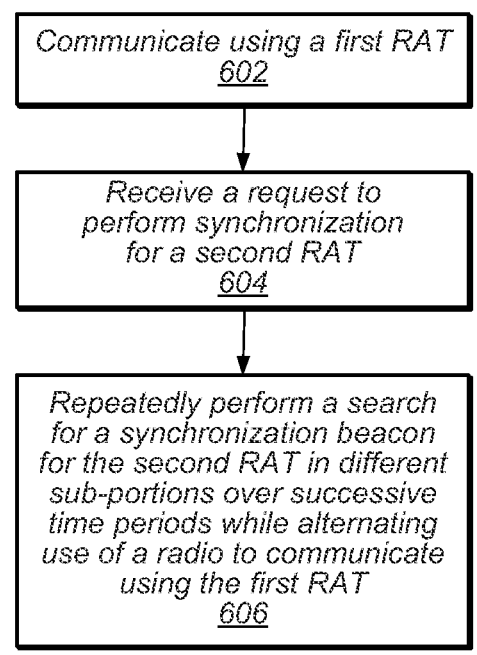
FIG. 6 is a flowchart diagram illustrating an exemplary method for performing intermittent synchronization detection.

FIG. 6—Intermittent Synchronization Beacon Detection

FIG. 6 is a flowchart diagram illustrating a method for performing intermittent synchronization beacon detection. The method may be performed by a UE device (such as UE 106) that uses a first radio for both a first RAT and a second RAT (e.g., LTE and GSM, although other combinations of RATs are envisioned). The method shown in FIG. 6 may be used in conjunction with any of the systems or devices shown in the above Figures, among other devices. In various embodiments, some of the method elements shown may be performed concurrently, in a different order than shown, or may be omitted. Note also that additional method elements may also be performed as desired. The method may be performed as follows.

As shown, in 602, the UE may communicate using a first RAT using the first radio. For example, the UE may perform data communication using the first RAT, or more generally, the first radio may be currently used for first RAT communication.

In 604, the UE may receive a request to perform synchronization, e.g., for neighboring base stations, of the second RAT. In order to perform synchronization, the UE may perform synchronization beacon detection (e.g., tone detection, such as detecting an FCCH burst for GSM). As discussed above, the synchronization beacon may be repeatedly transmitted in a periodic manner. For example, the synchronization beacon may be transmitted once during each repeated time length or time period (referred to as a "first time period" or "first time length" regarding FIG. 6, such as every 10 GSM frames in GSM embodiments).

In 606, the UE may repeatedly perform a search for the synchronization beacon in different sub-portions of the first time period over successive transmissions. More specifically, the UE may search for the synchronization beacon across the first time period, but may not have to search a single instance of the first time period (in other words, the search may occur across multiple first time periods). As a particular example, the UE may search a first n frames of the first time period in a first instance of the time period, the second n frames in a second instance of the time period, etc., until the entire time period has searched, over a plurality of instances of the time period.

Figure 7:
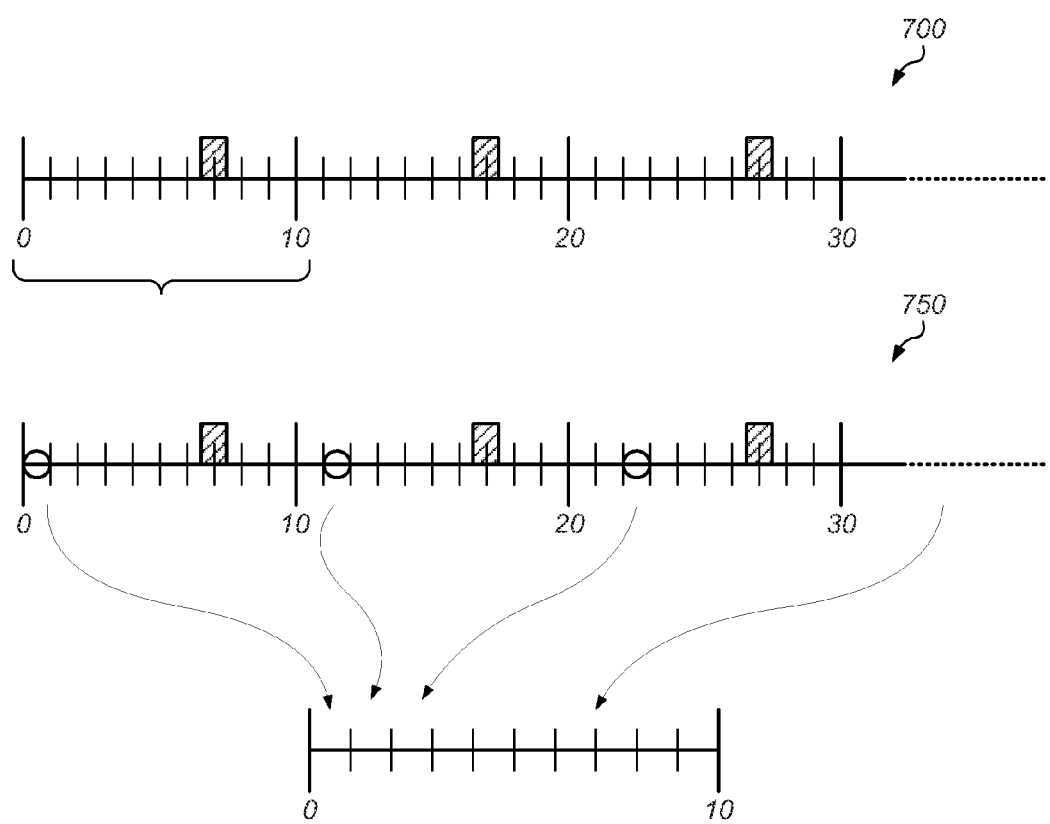
FIG. 7 is an exemplary timing diagram corresponding to one embodiment of FIG. 6.

FIG. 7 illustrates an exemplary timing diagram showing the difference between a continuous detection and an intermittent detection of the synchronization beacon. In particular, 700 illustrates a continuous detection of the synchronization beacon. In this instance, the UE may perform synchronization beacon detection across the first 10 frames (e.g., corresponding to a GSM embodiment). As shown, the FCCH beacon may be transmitted between the $6^{th}$ and $8^{th}$ frame of the 10 frames, each 10 frames (e.g., an exemplary first time period discussed above). In contrast, 750 shows an exemplary intermittent detection. In this example, the UE may perform sampling or measurement for only 1 frame of each 10 frames, and combine those samples together to perform synchronization beacon detection. In this example, the UE may sample the first frame of the first 10 frames, the second frame of the second 10 frames, the third frame of the third 10 frames, etc., in order to generate a "stitched together" 10 frame period, which may be used for synchronization beacon detection (in this case, detection of the FCCH beacon). As another example, 10 millisecond sampling may be performed, which may span across multiple frames, instead of the single frames shown in FIG. 7. In general, any desired sampling may be used, and the described and illustrated sampling of FIG. 7 is exemplary only.

In one embodiment, the synchronization beacon detection may be pipelined, e.g., may include sampling a portion of the first time period and performing synchronization beacon detection of that sample prior to performing the next sample (although there may be other delays, such as performing detection on a sample received two samples ago). In this embodiment, it may be possible to detect the synchronization beacon without having to sample the entire first period. In one embodiment, once the synchronization beacon is detected, the search may be ended.

In some embodiments, upon detection of the synchronization beacon, a confirmation of the synchronization beacon may be performed. For example, the location of the synchronization beacon may be sampled one or more times in later first time periods to confirm the synchronization beacon. Alternatively, or additionally, the search may simply be confirmed or performed across multiple instances of the first time period (e.g., combining together more than a single first time period amount, such as 10 frames for GSM).

In one embodiment, the method may use both continuous and intermittent detection. For example, an initial continuous detection may be performed, followed by intermittent detection for confirming the synchronization beacon. As a specific example, for GSM, the 10 frames may be continuously sampled initially, followed by detection of the synchronization beacon within the sampled 10 frames. After this detection, confirmation of the synchronization beacon may be performed for two additional 10 frame periods, but in an intermittent manner (e.g., where each sampled 10 frame period is formed from a plurality of 10 frame periods). Alternatively, or additionally, the UE may simply perform confirmation by sampling the particular frame(s) of the 10 frame period that correspond to the location of the detected synchronization beacon, rather than performing intermittent detection over the entire 10 frame period.

In one embodiment, this continuous followed by intermittent detection may be performed when a channel quality indicator (e.g., signal quality indicator, such as an RSSI, among other indicators) of the second RAT is below a threshold. When the channel quality indicator is above the threshold, intermittent detection may be performed throughout, e.g., for both initial detection and confirmation, without using continuous detection. In one embodiment, the threshold may be an RSSI value of approximately −90 dBm. For example, this approximate value may range +/−10 dBm from −90 dBm, if desired.

During intermittent detection, the UE may alternate between using the first radio for the first RAT (e.g., for data communication) and using the first radio to perform the synchronization beacon search (and potentially other activities, such as page detection) for the second RAT. As a result, the UE may avoid deep fading conditions in the first RAT due to a long tune away to perform continuous synchronization beacon detection in the second RAT, which may avoid significant throughput loss for the first RAT.

Using Frequency Error Estimate of a First RAT for a Second RAT

As discussed above, a UE may use a single radio (e.g., having a single transmit chain and a single receive chain) to communicate using two different RATs. For example, the UE may use a single radio to communicate using a first RAT and may periodically tune away in order to perform various actions for a second RAT, such as page decoding, measurement, synchronization, etc. In this example, the UE may be considered as maintaining a connection to both RATs using the same radio, even though it may only communicate using one RAT at a time. Note that the radio may be the single cellular radio for the UE or may be one of a plurality of cellular radios. In a multiple radio embodiment, and one of the cellular radios may be used for time-sharing of the first RAT and the second RAT. Additionally, the UE may implement dual SIM dual active (DSDA) and/or dual SIM dual standby (DSDS), as desired.

In one embodiment, the first RAT may be LTE and the second RAT may be GSM, although other combinations of RATs are envisioned. In some cases, it may be typical to tune away periodically in order to perform synchronization for the second RAT (e.g., for neighboring base stations of the current base station of the second RAT).

In the following, the first RAT may be described as LTE and the second RAT may be described as GSM, but any of these descriptions may apply to other RATs, as desired. The LTE DRX cycle may be approximately 1.28 seconds. Additionally, the GSM DRX cycle may occur every 470 milliseconds. GSM frequency Error Estimate (FEE) typically takes 200-500 ms and may be performed after multiple cycles of GSM DRX sleep and wakeup. The FEE is generally performed because there are frequency errors from the crystal oscillator which is used when GSM sleeps (e.g., the software stack associated with GSM, radio frequency circuitry associated with GSM, and/or other portions of the UE). At wakeup, if the frequency error is higher than a threshold and is not corrected, GSM TX/RX will be biased to a wrong frequency, and the network may not be able to decode the UE's transmission. Similarly, UE may not be able to decode network's response. Even though GSM FEE is not frequent (e.g., typically occurring once per 10-50 s), once it occurs, it may have a large impact on LTE performance for GSM-SRLTE or DSDS/DSDA. In particular, this extremely long tune away from LTE may dramatically drag down LTE throughput performance.

Accordingly, reducing the number of times GSM FEE is performed may improve this performance, particularly for LTE, when both GSM and LTE are used via a same radio. The following embodiments may be useful in reducing the frequency or occurrences of GSM FEE:

In SRLTE with GSM, because LTE and GSM time-share the same radio frequency circuitry (or at least a portion of the radio frequency circuitry), they may also use the same crystal oscillator while asleep. Additionally, LTE also performs FEE after multiple cycles of LTE sleep and wakeup. Accordingly, when LTE is active, even though GSM has multiple cycles of sleep and wakeup, GSM does not need to do FEE itself, instead, GSM can directly use the FEE result for LTE (or the effects of the FEE from LTE may also address the need to perform FEE for GSM). For example, in these embodiments, when FEE is performed for LTE the timer associated with performing GSM FEE may be reset, since the LTE FEE can be used for the GSM FEE.

However, if LTE (e.g., the software stack associated with LTE, radio frequency circuitry associated with LTE, and/or other portions of the UE) is sleeping, and if GSM FEE timer expires, which is the max time is reached when GSM hasn't perform FEE since the last FEE and sleep, GSM may perform its FEE.

The above embodiments may limit GSM FEE occurrence to when LTE is in sleep, and as a result, may almost eliminate the FEE long tune-away impact on LTE throughput performance. Thus, the above embodiments may restrict degradation down to access delay when LTE is wakeup from CDRX sleep.

Figure 8:
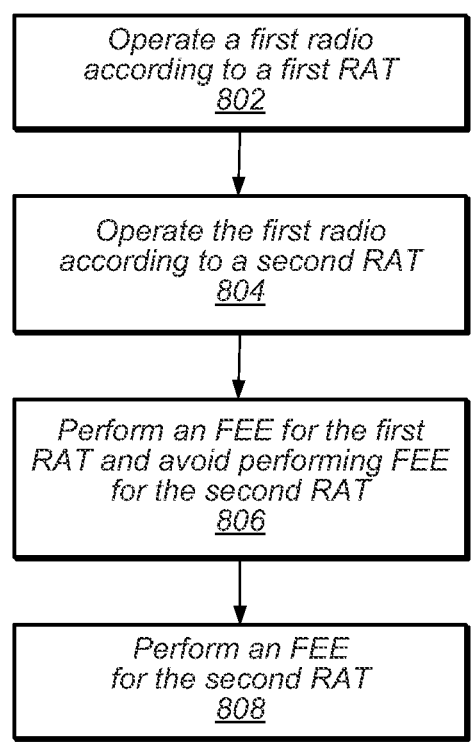
FIG. 8 is a flowchart diagram illustrating an exemplary method for using a frequency error estimate of a first RAT for a second RAT.

FIG. 8—Using Frequency Error Estimate of a First RAT for a Second RAT

FIG. 8 is a flowchart diagram illustrating a method for using a frequency error estimate of a first RAT for a second RAT. The method of FIG. 8 may be performed by a UE device (such as UE 106) that uses a first radio for both the first RAT and the second RAT (e.g., LTE and GSM, although other combinations of RATs are envisioned). The method shown in FIG. 8 may be used in conjunction with any of the systems or devices shown in the above Figures, among other devices. In various embodiments, some of the method elements shown may be performed concurrently, in a different order than shown, or may be omitted. Note also that additional method elements may also be performed as desired. The method may be performed as follows.

In 802, the UE may operate the first radio according to the first RAT. For example, a software stack associated with the first RAT may periodically use the first radio in performing communication using the first RAT. References to the first RAT performing actions or being asleep may refer to this first RAT software stack being executed to perform those actions, or being dormant.

In 804, the UE may operate the first radio according to the second RAT. For example, similar to above, a software stack associated with the second RAT may periodically use the first radio in performing communication using the second Rat. References to the first RAT performing actions or being asleep may refer to this second software stack being executed to perform those actions, or being dormant.

While operating according to the first RAT, the first radio may have a lesser frequency (or periodicity) of sleep and wake-up cycles than while operating according to the second RAT, which may have a greater frequency (or periodicity) of sleep and wake-up cycles. For example, the first RAT may have a cycle (e.g., a DRX cycle) that lasts 1.28 second while the second RAT may have a cycle (e.g., a DRX cycle) that lasts 470 milliseconds. Additionally, the first radio may use a first clock for operating according to both of the first RAT and the second RAT. For example, the first clock may be used during sleep cycles for the first RAT and may also be used during sleep cycles for the second RAT. The first clock may operate based on an oscillator (e.g., a crystal oscillator) of the UE.

Periodically, for both the first RAT and the second RAT, a frequency error estimate (FEE) may be performed in order to ensure that the first clock is within appropriate tolerance for communicating using the first RAT and/or the second RAT, e.g., upon waking from sleep. However, since the first clock is shared between the first RAT and the second RAT, it may be possible to use the results of the FEE for one of the RATs for the other RAT, without having to perform the FEE for both RATs.

Accordingly, when the first radio is being used for both the first RAT and the second RAT, an FEE of the first RAT may allow the second RAT to skip performing an FEE of the second RAT. For example, the first RAT may be LTE and the second RAT may be GSM. In one embodiment, an FEE may be performed for the first RAT (in this example, LTE) during operation (e.g., this FEE may be performed periodically, such according to an FEE timer of the first RAT). For example, the FEE may be performed for the first RAT after multiple sleep and wake-up cycles associated with the first RAT, e.g., a predefined number of cycles.

During this period, the first radio may be used for both the first RAT and the second RAT. The second RAT may also be configured to periodically perform the FEE for the second RAT, e.g., according to its own FEE timer. For example, the timer may be used to indicate when a FEE may be performed for the second RAT. However, when the FEE for the first RAT is performed, the need to perform the FEE for the second RAT may no longer be necessary, e.g., since the results of the FEE may adjust the first clock or may used by the second RAT for adjusting the first clock or another clock, if desired. For example, in one embodiment, adjusting the first clock based on the FEE of the first RAT may resolve any need to perform FEE and first clock adjustment for the second RAT. In one embodiment, the timer for the second RAT may simply be reset upon performing the FEE for the first RAT. Alternatively, any measurements or adjustments determined from the FEE of the first RAT may be usable for measurements or adjustments for the second RAT, without having to perform a new FEE for the second RAT. Even further, if separate clocks are used for the first and second RATs, e.g., and they are based on a same oscillator, the FEE of the first RAT may be used to adjust the clock of the second RAT. Thus, in this embodiment, the results of the FEE of the first RAT may be used for the second RAT without performing a separate FEE for the second RAT, which may significantly reduce or remove tuneaways of the first radio from the first RAT to the second RAT for the purpose of performing FEE of the second RAT, which may reduce throughput degradation of the first RAT.

Thus, in 806, an FEE for the first RAT may be performed, and accordingly, an FEE for the second RAT may be able to be avoided, as discussed above.

Later, in 808, an FEE for the second RAT may be performed. In one embodiment, the FEE for the second RAT may be performed in situations where the first RAT is asleep or has not been recently used and an FEE for the first RAT was not recent enough. For example, if the first RAT is asleep and a timer for performing FEE for the second RAT expires, the FEE may be performed for the second RAT.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for operating a UE device, the method comprising:
    within a user equipment device (UE) comprising a first radio, wherein the first radio is configurable to operate according to a first radio access technology (RAT) and a second RAT:
        performing communication according to the first RAT using the first radio with a base station, wherein a synchronization beacon is provided on the second RAT, wherein the synchronization beacon repetitively occurs in successive first time periods;
        repeatedly performing a search for the synchronization beacon in different sub-portions of the first time period over successive first time periods using the first radio, wherein the search is repeatedly performed until the synchronization beacon is located in a respective sub-portion of one of the successive first time periods.

2. The method of claim 1, further comprising:
    determining a channel quality of the second RAT; and
    comparing the channel quality to a threshold;
    wherein said repeatedly performing the search for the synchronization beacon is performed based on comparing the channel quality to the threshold.

3. The method of claim 2, wherein the threshold is approximately −90 dBm.

4. The method of claim 2, wherein determining the channel quality comprises determining a received signal strength indicator (RSSI) of the second RAT.

5. The method of claim 2, wherein when the channel quality is less than the threshold, the method comprises:
    performing a search for the synchronization beacon in a single first time period;
    wherein said repeatedly performing the search for the synchronization beacon in different sub-portions of the first time period over successive first time periods is performed in an addition to the search for the synchronization beacon in the single first time period.

6. The method of claim 5, wherein when the channel quality is above the threshold, said repeatedly performing the search is performed instead of performing the search for the synchronization beacon in a single first time period.

7. The method of claim 1, wherein said repeatedly performing the search comprises:
    sampling a first sub-portion of the first time period in a first successive first time period;
    performing synchronization beacon detection of the first sub-portion of the first time period in the first successive first time period; and
    concurrently with performing the synchronization beacon detection, sampling a second sub-portion of the first time period in a second successive first time period.

8. The method of claim 1,
    wherein said repetitively performing causes a base station of the first RAT to observe multiple quick fading instances for the UE over the first time period, resulting in a lower average block error rate (BLER) than performing synchronization beacon detection in a single first time period.

9. The method of claim 1, wherein the first RAT comprises long term evolution (LTE) and wherein the second RAT comprises global system for mobile communications (GSM).

10. The method of claim 1, wherein the synchronization beacon comprises a burst on a frequency correction channel (FCCH) of the second RAT.

11. An apparatus, comprising:
    a processing element comprised in a user equipment device (UE), wherein the processing element is configured to:
        perform communication according to a first radio access technology (RAT) with a base station of the first RAT using a first radio, wherein the first radio is also configured for communication according to a second RAT, wherein a synchronization beacon is provided by a base station of the second RAT, wherein the synchronization beacon repetitively occurs in successive first time periods;
        while performing communication according to the first RAT, repeatedly perform a search for a synchronization beacon for a second RAT in different sub-portions of the first time period over successive first time periods, wherein the search is repeatedly performed until the synchronization beacon is located in a respective sub-portion of one of the successive first time periods, wherein the performing the search for the synchronization beacon is performed using the first radio.

12. The apparatus of claim 11, wherein the processing element is further configured to:
    determine a channel quality of the second RAT; and
    compare the channel quality to a threshold;
    wherein said repeatedly performing the search for the synchronization beacon is performed based on comparing the channel quality to the threshold.

13. The apparatus of claim 12, wherein determining the channel quality comprises determining a signal strength of the base station of the second RAT.

14. The apparatus of claim 12, wherein when the channel quality is less than the threshold, the processing element is further configured to:
    perform a search for the synchronization beacon in a single first time period;
    wherein said repeatedly performing the search for the synchronization beacon in different sub-portions of the first time period over successive first time periods is performed in an addition to the search for the synchronization beacon in the single first time period.

15. The apparatus of claim 11, wherein the first time period comprises ten frames, and wherein the synchronization beacon comprises a frequency correction channel (FCCH) burst.

16. The apparatus of claim 11, wherein said repeatedly performing the search comprises:
   sampling a first sub-portion of the first time period in a first successive first time period;
   performing synchronization beacon detection of the first sub-portion of the first time period in the first successive first time period; and
   concurrently with performing the synchronization beacon detection, sampling a second sub-portion of the first time period in a second successive first time period.

17. The apparatus of claim 11, wherein the UE comprises two smart cards which are each configured to implement SIM (Subscriber Identity Module) functionality, wherein the UE is configured to implement DSDA (Dual SIM Dual Active) functionality using the first radio.

18. A non-transitory, computer accessible memory medium storing program instructions for performing selective measurement within a user equipment device (UE), wherein the UE comprises a first radio for communicating using a first radio access technology (RAT) and a second RAT, wherein the program instructions are executable by a processor to:
   perform first RAT transmission with a first RAT base station using the first radio;
   perform a plurality of second RAT tune-away operations to search for a second RAT synchronization beacon, spread over a first time period, wherein each of the plurality of second RAT tune-away operations is shorter than a standard second RAT tune-away operation for searching for the second RAT synchronization beacon, wherein the first time period is longer than the standard second RAT tune-away operation for searching for the second RAT synchronization beacon.

19. The non-transitory, computer accessible memory medium of claim 18, wherein the second RAT comprises global system for mobile communications (GSM), and wherein the synchronization beacon comprises a burst on a frequency correction channel (FCCH).

20. The non-transitory, computer accessible memory medium of claim 18, wherein the synchronization beacon is repeatedly broadcast every n frames, wherein said performing a plurality of second RAT tune-away operations comprises:
   sampling a first sub-portion of a first set of n frames;
   performing synchronization beacon detection of the first sub-portion of the first set of n frames; and
   concurrently with performing the synchronization beacon detection, sampling a second sub-portion of a second set of n frames, wherein the first sub-portion is a different sub-portion of the first set of n frames than the second sub-portion is in the second set of n frames.

* * * * *